[12] United States Patent
Ebrahimi Afrouzi et al.

(10) Patent No.: US 10,755,430 B1
(45) Date of Patent: Aug. 25, 2020

(54) METHOD FOR ESTIMATING DISTANCE USING POINT MEASUREMENT AND COLOR DEPTH

(71) Applicants: Ali Ebrahimi Afrouzi, San Jose, CA (US); Soroush Mehrnia, Soeborg (DK)

(72) Inventors: Ali Ebrahimi Afrouzi, San Jose, CA (US); Soroush Mehrnia, Soeborg (DK)

(73) Assignee: AI Incorporated, Toronto (CA)

( * ) Notice: Subject to any disclaimer, the term of this patent is extended or adjusted under 35 U.S.C. 154(b) by 0 days.

(21) Appl. No.: 16/393,921

(22) Filed: Apr. 24, 2019

Related U.S. Application Data

(63) Continuation of application No. 15/447,122, filed on Mar. 2, 2017, now Pat. No. 10,311,590.

(51) Int. Cl.
H04N 7/18 (2006.01)
G06T 7/60 (2017.01)
G01C 3/08 (2006.01)
G06T 7/90 (2017.01)

(52) U.S. Cl.
CPC .............. G06T 7/60 (2013.01); G01C 3/08 (2013.01); G06T 7/90 (2017.01); H04N 7/18 (2013.01); G06T 2207/10024 (2013.01); G06T 2207/10028 (2013.01)

(58) Field of Classification Search
CPC ... G06T 7/60; G06T 7/90; G06T 2207/10024; G06T 2207/10028; G01C 3/08; H04N 7/18

USPC .......... 348/135, 42, 118; 382/153, 154, 104, 382/106
See application file for complete search history.

(56) References Cited

U.S. PATENT DOCUMENTS

| 5,521,695 | A | 5/1996 | Cathey |
| 6,057,909 | A | 5/2000 | Yahav |
| 6,847,435 | B2 | 1/2005 | Honda |
| 7,386,163 | B2 * | 6/2008 | Sabe ................. G06K 9/00664 348/118 |
| 7,706,573 | B1 | 4/2010 | Motamedi |
| 7,865,267 | B2 * | 1/2011 | Sabe ................. G06K 9/00201 345/419 |
| 8,140,395 | B2 | 3/2012 | Murphy |
| 8,164,628 | B2 | 4/2012 | Stein |
| 8,265,425 | B2 | 9/2012 | Ng-Thow-Hing |
| 8,467,578 | B2 | 6/2013 | Chang |
| 8,705,801 | B2 | 4/2014 | Kawamura |
| 2010/0118142 | A1 | 5/2010 | Ohsawa |

* cited by examiner

Primary Examiner — Trang U Tran

(57) ABSTRACT

A method including: positioning sensors on a robotic device; positioning a camera on the robotic device; capturing an image of the environment; measuring color depth of each pixel in the image; classifying each pixel into a color depth range; determining for at least one set of two points captured in the image, if the color depth of pixels measured in a region between the two points is within a predetermined range of color; generating at least one line between the two points when the color depth of pixels measured in the region between the two points is within the predetermined range of color; identifying on a map of the environment a wall surface on which the line is generated as a flat wall surface; and adjusting a heading of the robotic device relative to an angle of the wall surface.

20 Claims, 1 Drawing Sheet

METHOD FOR ESTIMATING DISTANCE
USING POINT MEASUREMENT AND
COLOR DEPTH

CROSS-REFERENCE TO RELATED APPLICATIONS

This application is a Continuation of patent application Ser. No. 15/447,122, filed Mar. 2, 2017, which claims the benefit of the Provisional Patent Application No. 62/302,095, filed Mar. 1, 2016.

FIELD OF THE DISCLOSURE

The present invention relates to distance measurement and estimation and two-dimensional mapping.

BACKGROUND

Creating a two dimensional map of a work environment is a common problem for mobile robotic devices that is being solved in various ways. SLAM (simultaneous localization and mapping) is one solution for creating a map of a work environment. However, SLAM requires expensive technology and a lot of processing power and time. A need exists for simpler methods for constructing environment maps. In some cases, a mobile robotic device's performance can be greatly increased with only a few important pieces of information, such as the location or existence of walls or other flat surfaces. A need exists for a method to detect flat surfaces.

SUMMARY

The following presents a simplified summary of some embodiments of the techniques described herein in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Included is a method for identifying flat surfaces of an environment within which a robotic device operates, including: positioning at least two sensors on a housing of the robotic device, each of the at least two sensors positioned at an angle relative to a vertical or horizontal plane and configured to detect obstacles in their direct line of sight; positioning a camera on the robotic device at an angle relative to a vertical or horizontal plane such that the camera is positioned on the housing of the robot on which the at least two sensors lie; capturing, with the camera, an image of the environment; measuring, with a processor of the robotic device, color depth of each pixel in the captured image; classifying, with the processor, each pixel into a color depth range based on the color depth of each pixel; determining, with the processor, for at least one set of two points captured in the image, if the color depth of pixels measured in a region between the two points is within a predetermined range of color; generating, with the processor, at least one line between the two points of the at least one set of two points when the color depth of pixels measured in the region between the two points is within the predetermined range of color; identifying, with the processor, on a map of the environment a wall surface on which the line is generated as a flat wall surface; determining, with the processor, at least an angle of the wall surface using a triangulation technique; and adjusting, with the processor, a heading of the robotic device relative to the angle of the wall surface.

Provided is a robotic device, including: a housing including at least a first and a second sensor positioned on a like plane and configured to detect obstacles in their direct line of sight; a camera positioned on the robotic device at an angle relative to a vertical or horizontal plane such that the camera is positioned on the housing of the robot on which the at least two sensors lie; and a processor configured to perform the following steps: causing the camera to capture an image of an environment within which the robot operates; measuring color depth of each pixel in the captured image; classifying each pixel into a color depth range based on the color depth of each pixel; determining for at least one set of two points captured in the image, if the color depth of pixels measured in a region between the two points is within a predetermined range of color; generating at least one line between the two points of the at least one set of two points when the color depth of pixels measured in the region between the two points is within the predetermined range of color.

DETAILED DESCRIPTION OF SOME EMBODIMENTS

Figure 1A:
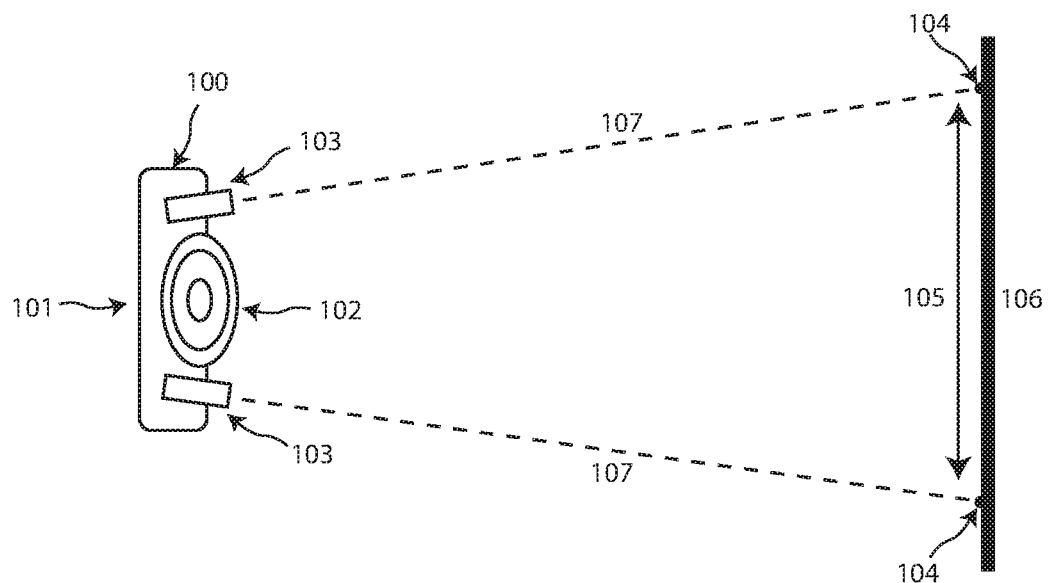
FIG. 1A illustrates an example of a method for estimating distances to a flat wall, according to some embodiments.

The present invention will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present invention may be practiced without some or all of these specific details. In other instances, well known process steps and/or structures have not been described in detail in order to not unnecessarily obscure the present invention. Further, it should be emphasized that several inventive techniques are described, and embodiments are not limited to systems implanting all of those techniques, as various cost and engineering trade-offs may warrant systems that only afford a subset of the benefits described herein or that will be apparent to one of ordinary skill in the art.

Some embodiments include a method for distance estimation and building a map of an environment using computer vision techniques to extract color characteristics of the environment. In some embodiments, two laser rangefinders, a camera, and an image processing unit are disposed on a main housing.

In some embodiments, the camera and two laser rangefinders are positioned such that the laser rangefinders analyze predetermined lines of sight within the camera's image frame. In some embodiments, the laser rangefinders measure the distance to the first encountered obstacle in their respective lines of sight. Each line of sight intersects with an obstacle at an arbitrary point, which shall be referred to herein as the first and second points. In some embodiments, the camera captures an image of the area. In a next step, the image processing unit calculates the color depths at the first and second points. In a next step, the image processing unit calculates the color depth of the pixels that form a straight line between the first and second points (referred to herein as the Connecting Line) and compares the color depth of these pixels with the color depths of the first and second points. In some embodiments, if the color depth of all the pixels in the Connecting Line is consistent with (or within a preset range of) the color depths of the first and second points, the system determines that the distances of all the pixels in that region are within a threshold from the distances measured by the laser rangefinder at the first and second points. In some embodiments, when the color depth of the Connecting Line is within a preset range of the color depths of the first and second points, the system determines that the surface or obstacle being analyzed is a substantially flat surface.

In some embodiments, the laser rangefinders are positioned such that they diverge from each other at a predetermined angle relative to a vertical plane. In other embodiments, laser rangefinders may also be positioned to diverge from each other at a predetermined angle relative to a horizontal plane. This will allow the system to analyze a greater distance between the first and second points.

In embodiments in which the laser rangefinders are positioned such that they diverge from each other at preset angles, triangulation may be used to aid in building a map of the area being analyzed. In such embodiments, the laser rangefinders must be positioned at substantially a single origin point so that the lines of sight thereof, together with the Connecting Line, form a triangle. If the color depth along the Connecting Line is within the preset range of the first and second points, then the triangle formed by the laser rangefinders and the substantially flat surface may be analyzed. The point of origin of the laser rangefinders, together with the points where each line of sight intersects with an obstacle, form three vertices of a triangle. In some embodiments, the length of the two sides of the triangle that are the lines of sights of the laser rangefinders are measured by the laser rangefinders, and the angle between them is known, therefore the remaining angles and triangle side can be calculated by triangulation. Thus, the length of the Connecting Line can be calculated, and this information may be used in mapping a work area. Further, the angle of the detected flat surface can be estimated through triangulation and used in mapping the work area or for any other purpose. For example, a mobile robotic device may adjust its heading with respect to the angle of a wall when orientation is relevant to work.

FIG. 1A illustrates an overhead view of an example of a distance measurement method. A distance measurement device 100 has a main body 101, a camera 102, and two laser rangefinders 103. The laser rangefinders 103 measure the distance to the first obstacle, in this case wall 106. The intersection of each laser rangefinder line of sight 107 with the obstacle 106 results in the first and second points 104. In a next step, the camera captures an image of the area and transmits it to the image processing unit. The image processing unit extracts color depth information at the points 104. Then, the image processing unit extracts the color depth information from the pixels that form the straight line 105 between the points 104. In a next step, the system compares the color depth of the pixels in line 105 with the color depth of the points 104. If the color depth falls within a predetermined threshold, the distance of the area in between the points 104 can be assumed to be within a predetermined range of the measured distances to the points 104.

Figure 1B:
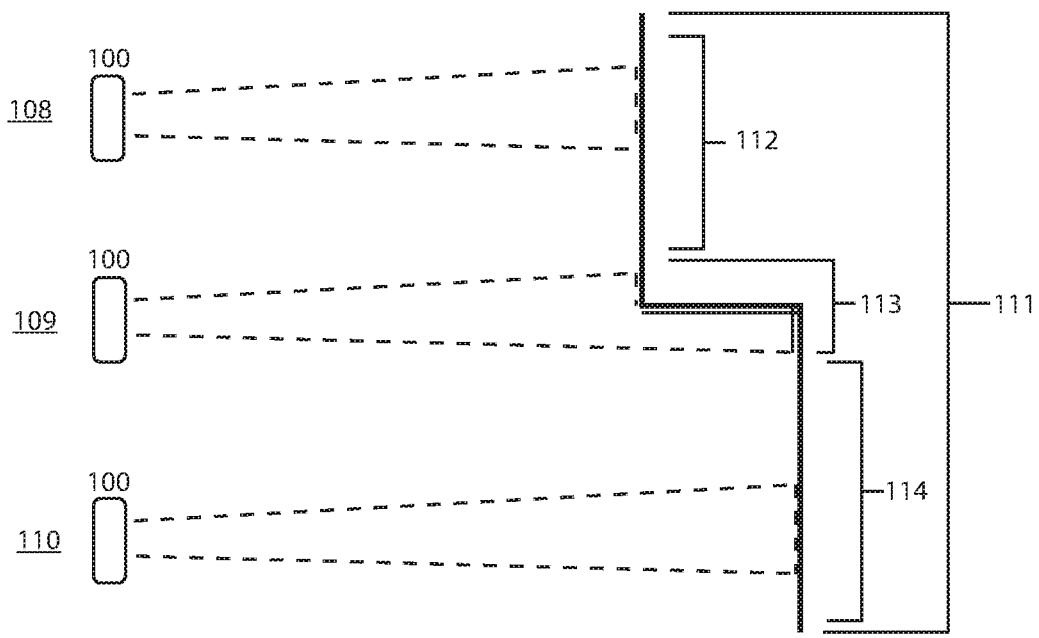
FIG. 1B illustrates an example of a method for estimating distances to an obscure (non-flat) wall, according to some embodiments.

FIG. 1B illustrates an overhead view of an example of a distance measurement method. A wall 111 has two substantially flat portions 112, 114 and a portion 113 that is not flat. At location 108, distance measurement device 100 works in the same way as described above and detects a substantially flat surface. At location 109, the color depths at the two points will be substantially different from each other, so the system concludes that the surface between them is not flat. At location 110, the distance measurement device 100 analyzes the second flat portion 114 of the wall 111 and identifies it as flat.

In block diagrams, illustrated components are depicted as discrete functional blocks, but embodiments are not limited to systems in which the functionality described herein is organized as illustrated. The functionality provided by each of the components may be provided by specialized software or specially designed hardware modules that are differently organized than is presently depicted; for example, such software or hardware may be intermingled, conjoined, replicated, broken up, distributed (e.g. within a data center or geographically), or otherwise differently organized. The functionality described herein may be provided by one or more processors of one or more computers executing specialized code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The present techniques will be better understood with reference to the following enumerated embodiments:

1. A method for identifying flat surfaces of an environment within which a robotic device operates, comprising: positioning at least two sensors on a housing of the robotic device, each of the at least two sensors positioned at an angle relative to a vertical or horizontal plane and configured to detect obstacles in their direct line of sight; positioning a camera on the robotic device at an angle relative to a vertical or horizontal plane such that the camera is positioned on the housing of the robot on which the at least two sensors lie; capturing, with the camera, an image of the environment; measuring, with a processor of the robotic device, color depth of each pixel in the captured image; classifying, with the processor, each pixel into a color depth range based on the color depth of each pixel; determining, with the processor, for at least one set of two points captured in the image, if the color depth of pixels measured in a region between the two points is within a predetermined range of color; generating, with the processor, at least one line between the two points of the at least one set of two points when the color depth of pixels measured in the region between the two points is within the predetermined range of color; identifying, with the processor, on a map of the environment a wall surface on which the line is generated as a flat wall surface; determining, with the processor, at least an angle of the wall surface using a triangulation technique; and adjusting, with the processor, a heading of the robotic device relative to the angle of the wall surface.

2. The method of embodiment 1, wherein a first and a second sensor of the at least two sensors are positioned on the same horizontal plane at a preset angle diverging from each other.

3. The method of embodiments 1-2, wherein a first and a second sensor of the at least two sensors are positioned on the same vertical plane at a preset angle diverging from each other.

4. The method of embodiment 2, wherein the first and second sensor of the at least two sensors are positioned at substantially the same origin.

5. The method of embodiment 3, wherein the first and second laser sensor of the at least two sensors are positioned at substantially the same origin.

6. The method of embodiments 1-5, wherein the processor uses the triangulation technique to determine a length and an angle of the at least one line.

7. The method of embodiments 1-6, wherein the heading of the robotic device is adjusted such that the robotic device travels along a path parallel to the wall surface.

8. A robotic device, comprising: a housing including at least a first and a second sensor positioned on a like plane and configured to detect obstacles in their direct line of sight; a camera positioned on the robotic device at an angle relative to a vertical or horizontal plane such that the camera is positioned on the housing of the robot on which the at least two sensors lie; and a processor configured to perform the following steps: causing the camera to capture an image of an environment within which the robot operates; measuring color depth of each pixel in the captured image; classifying each pixel into a color depth range based on the color depth of each pixel; determining for at least one set of two points captured in the image, if the color depth of pixels measured in a region between the two points is within a predetermined range of color; generating at least one line between the two points of the at least one set of two points when the color depth of pixels measured in the region between the two points is within the predetermined range of color.

9. The robotic device of embodiment 8, wherein the processor is further configured to identify on a map of the environment a wall surface on which the line is generated as a flat wall surface.

10. The robotic device of embodiments 8-9, wherein the processor is further configured to determine at least an angle of the wall surface using a triangulation technique.

11. The robotic device of embodiment 10, wherein the processor is further configured to adjust a heading of the robotic device relative to the angle of the wall surface.

12. The robotic device of embodiments 8-11, wherein a first and a second sensor of the at least two sensors are positioned on the same horizontal plane at a preset angle diverging from each other.

13. The robotic device of embodiments 8-12, wherein a first and a second sensor of the at least two sensors are positioned on the same vertical plane at a preset angle diverging from each other.

14. The robotic device of embodiment 12, wherein the first and second sensor of the at least two sensors are positioned at substantially the same origin.

15. The robotic device of embodiment 13, wherein the first and second laser sensor of the at least two sensors are positioned at substantially the same origin.

16. The robotic device of embodiments 8-15, wherein the processor uses the triangulation technique to determine a length and an angle of the at least one line.

17. The robotic device of embodiment 11, wherein the heading of the robotic device is adjusted such that the robotic device travels along a path parallel to the wall surface.

18. The robotic device of embodiments 8-17, wherein the processor is further configured to use a triangulation technique to determine a length and an angle of the at least one line between the two points.

The invention claimed is:

1. A method for identifying flat surfaces of an environment within which a robotic device operates, comprising:
positioning at least two sensors on a housing of the robotic device, each of the at least two sensors positioned at an angle relative to a vertical or horizontal plane and configured to detect obstacles in their direct line of sight;
positioning a camera on the robotic device at an angle relative to a vertical or horizontal plane such that the camera is positioned on the housing of the robot on which the at least two sensors lie;
capturing, with the camera, an image of the environment;
measuring, with a processor of the robotic device, color depth of each pixel in the captured image;
classifying, with the processor, each pixel into a color depth range based on the color depth of each pixel;
determining, with the processor, for at least one set of two points captured in the image, if the color depth of pixels measured in a region between the two points is within a predetermined range of color;
generating, with the processor, at least one line between the two points of the at least one set of two points when the color depth of pixels measured in the region between the two points is within the predetermined range of color;
identifying, with the processor, on a map of the environment a wall surface on which the line is generated as a flat wall surface;
determining, with the processor, at least an angle of the wall surface using a triangulation technique; and
adjusting, with the processor, a heading of the robotic device relative to the angle of the wall surface.

2. The method of claim 1, wherein a first and a second sensor of the at least two sensors are positioned on the same horizontal plane at a preset angle diverging from each other.

3. The method of claim 1, wherein a first and a second sensor of the at least two sensors are positioned on the same vertical plane at a preset angle diverging from each other.

4. The method of claim 2, wherein the first and second sensor of the at least two sensors are positioned at substantially the same origin.

5. The method of claim 3, wherein the first and second laser sensor of the at least two sensors are positioned at substantially the same origin.

6. The method of claim 1, wherein the processor uses the triangulation technique to determine a length and an angle of the at least one line.

7. The method of claim 1, wherein the heading of the robotic device is adjusted such that the robotic device travels along a path parallel to the wall surface.

8. A robotic device, comprising:
a housing including at least a first and a second sensor positioned on a like plane and configured to detect obstacles in their direct line of sight;
a camera positioned on the robotic device at an angle relative to a vertical or horizontal plane such that the camera is positioned on the housing of the robot on which the at least two sensors lie; and
a processor configured to perform the following steps:
causing the camera to capture an image of an environment within which the robot operates;
measuring color depth of each pixel in the captured image;
classifying each pixel into a color depth range based on the color depth of each pixel;
determining for at least one set of two points captured in the image, if the color depth of pixels measured in a region between the two points is within a predetermined range of color;
generating at least one line between the two points of the at least one set of two points when the color depth of pixels measured in the region between the two points is within the predetermined range of color;

determining at least an angle of a wall surface using a triangulation technique; and adjusting a heading of the robotic device relative to the angle of the wall surface.

9. The robotic device of claim 8, wherein the processor is further configured to identify on a map of the environment a wall surface on which the line is generated as a flat wall surface.

10. The robotic device of claim 8, wherein a first and a second sensor of the at least two sensors are positioned on the same horizontal plane at a preset angle diverging from each other.

11. The robotic device of claim 8, wherein a first and a second sensor of the at least two sensors are positioned on the same vertical plane at a preset angle diverging from each other.

12. The robotic device of claim 10, wherein the first and second sensor of the at least two sensors are positioned at substantially the same origin.

13. The robotic device of claim 11, wherein the first and second laser sensor of the at least two sensors are positioned at substantially the same origin.

14. The robotic device of claim 8, wherein the processor uses the triangulation technique to determine a length and an angle of the at least one line.

15. The robotic device of claim 8, wherein the heading of the robotic device is adjusted such that the robotic device travels along a path parallel to the wall surface.

16. The robotic device of claim 8, wherein the processor is further configured to use a triangulation technique to determine a length and an angle of the at least one line between the two points.

17. A robotic device, comprising:
at least two sensors disposed on the robotic device, each of the at least two sensors positioned at an angle relative to a vertical or horizontal plane and configured to detect obstacles in their direct line of sight;
a camera disposed on the robotic device at an angle relative to a vertical or horizontal plane;
a processor;
a tangible, non-transitory, machine-readable medium storing instructions that when executed by the processor effectuate operations comprising:
capturing, with the camera, an image of the environment;
measuring, with the processor, color depth of each pixel in the captured image;
classifying, with the processor, each pixel into a color depth range based on the color depth of each pixel;
determining, with the processor, for at least one set of two points captured in the image, if the color depth of pixels measured in a region between the two points is within a predetermined range of color;
generating, with the processor, at least one line between the two points of the at least one set of two points when the color depth of pixels measured in the region between the two points is within the predetermined range of color;
identifying, with the processor, on a map of the environment a wall surface on which the line is generated as a flat wall surface;
determining, with the processor, at least an angle of the wall surface using a triangulation technique; and
adjusting, with the processor, a heading of the robotic device relative to the angle of the wall surface.

18. The robotic device of claim 17, wherein a first and a second sensor of the at least two sensors are positioned on the same horizontal or vertical plane at a preset angle diverging from each other.

19. The robotic device of claim 17, wherein the processor uses the triangulation technique to determine a length and an angle of the at least one line.

20. The robotic device of claim 17, wherein the heading of the robotic device is adjusted such that the robotic device travels along a path parallel to the wall surface.

* * * * *